Jan. 19, 1954     L. BROWN     2,666,346
SAW SHARPENING MACHINE
Filed July 2, 1948     4 Sheets-Sheet 1
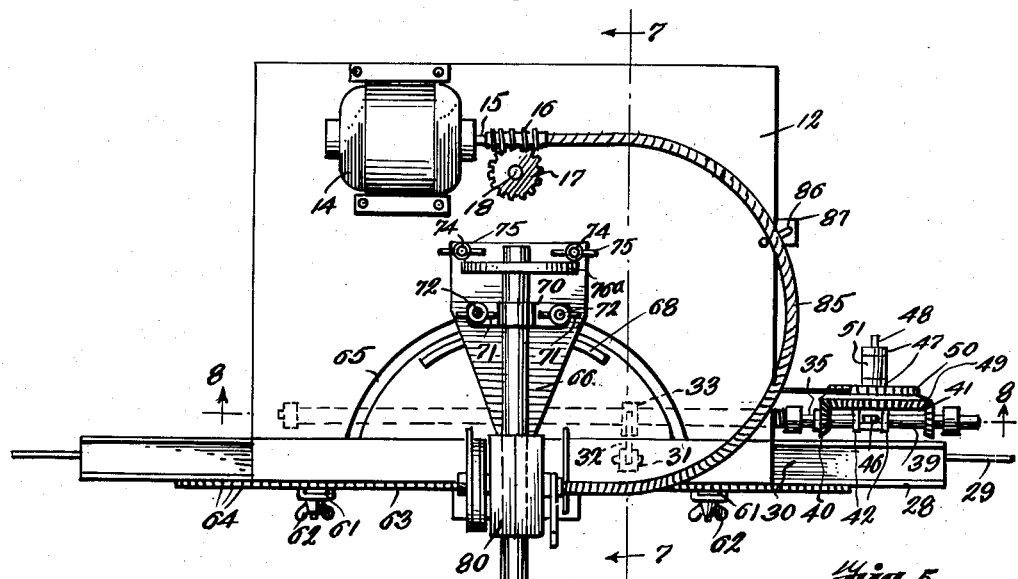
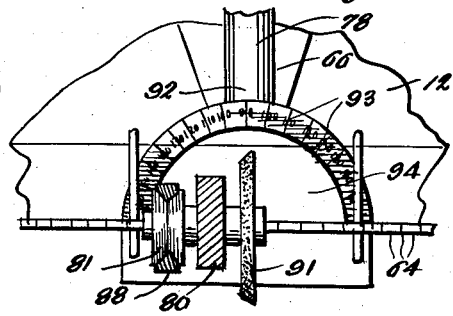
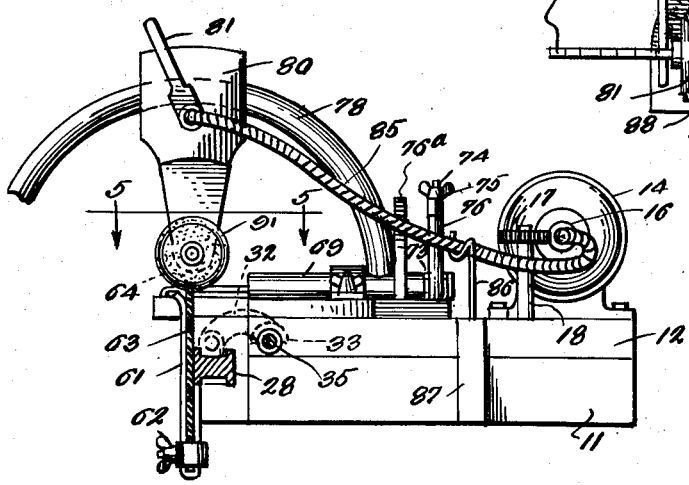
Inventor
LUTE BROWN
By Randolph & Beavers
Attorneys Jan. 19, 1954 L. BROWN 2,666,346
SAW SHARPENING MACHINE
Filed July 2, 1948 4 Sheets-Sheet 2

INVENTOR.
LUTE BROWN
BY
Randolph & Beavers
ATTORNEYS

Jan. 19, 1954      L. BROWN      2,666,346
SAW SHARPENING MACHINE
Filed July 2, 1948      4 Sheets-Sheet 3
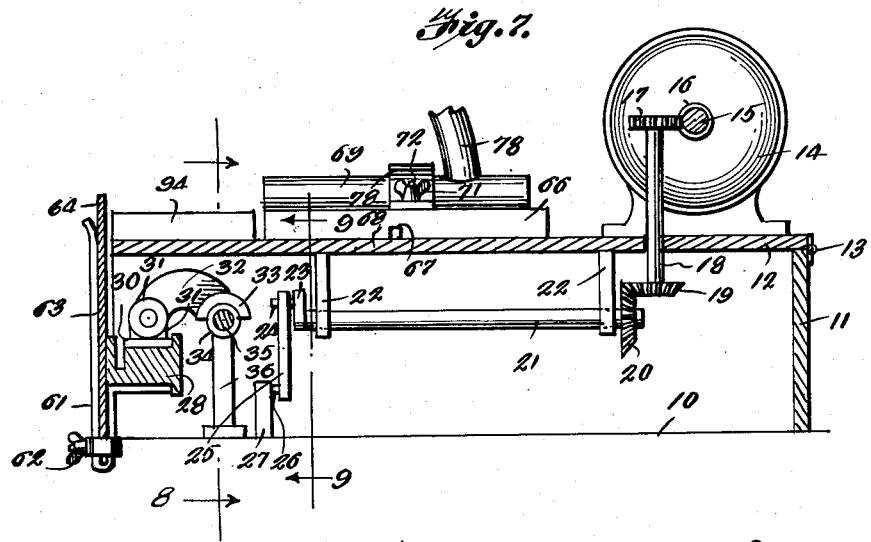
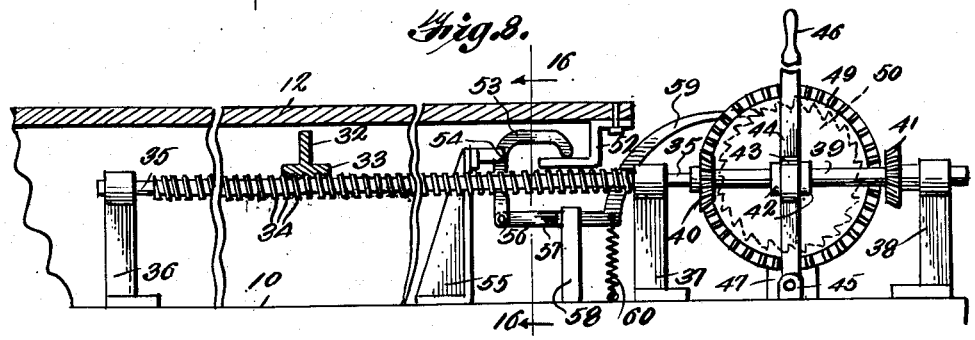
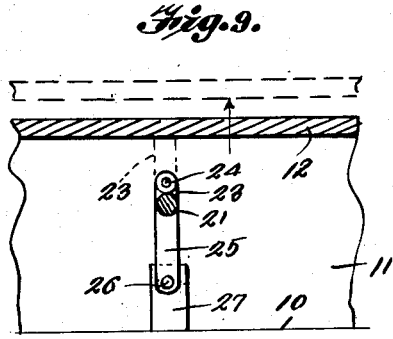
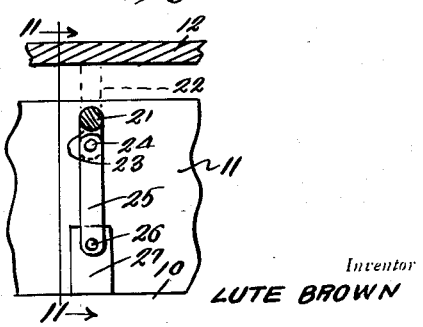
Inventor
LUTE BROWN
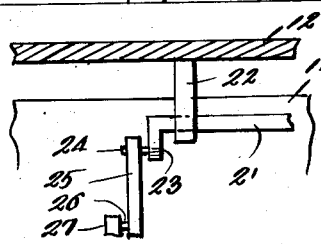
By Randolph & Beavers
Attorneys Jan. 19, 1954
L. BROWN
2,666,346
SAW SHARPENING MACHINE
Filed July 2, 1948
4 Sheets-Sheet 4
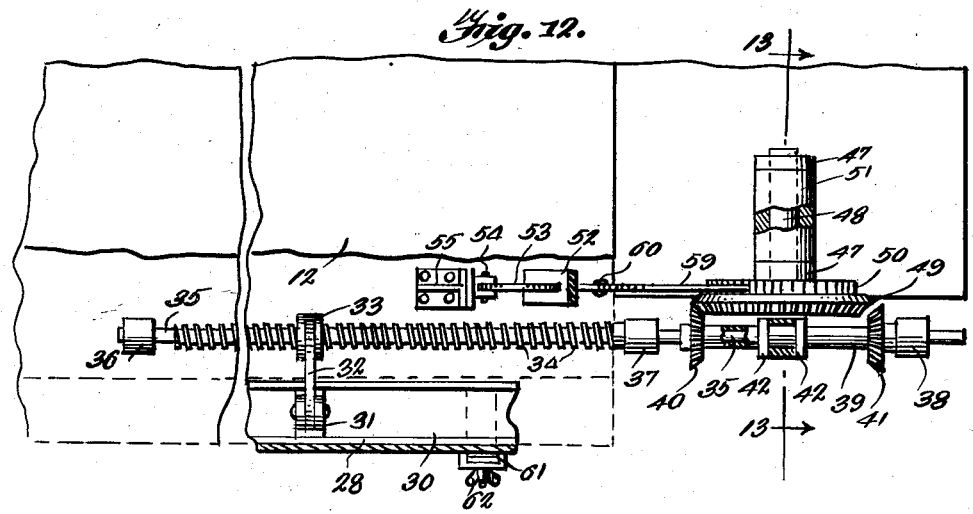
Inventor
LUTE BROWN
By Randolph & Beavers
Attorneys Patented Jan. 19, 1954

2,666,346

UNITED STATES PATENT OFFICE 2,666,346

SAW SHARPENING MACHINE

Lute Brown, Fairmont, W. Va.

Application July 2, 1948, Serial No. 36,657

1 Claim. (Cl. 76—40)

The present invention relates to a saw sharpening machine and it consists in the combinations, constructions and arrangements of parts herein described and claimed.

It is an object of the present invention to provide a saw sharpening machine in which the sharpening means is adjustable with regard to the pitch, bevel and incline of the teeth of a saw.

Another object of the invention is the provision of a saw sharpening machine wherein a high speed grinding wheel is employed as the sharpening medium.

Another object of the invention is the provision of a saw sharpening machine which is simple in construction, quickly and easily adjustable and rapid, accurate and economical in its operation.

A further object of the invention is the provision of novel means for the accurate adjustment and positioning of a grinding wheel with respect to a saw in a saw sharpening machine.

A still further object of the invention is the provision of novel reversing mechanism in a saw sharpening machine.

Other and further objects of the invention will become apparent from a reading of the following specification taken in conjunction with the drawings, in which:

Figure 1 is a plan view of an embodiment of the invention,

Figure 2 is a side elevational view, partly in section, of Figure 1,

Figure 3:
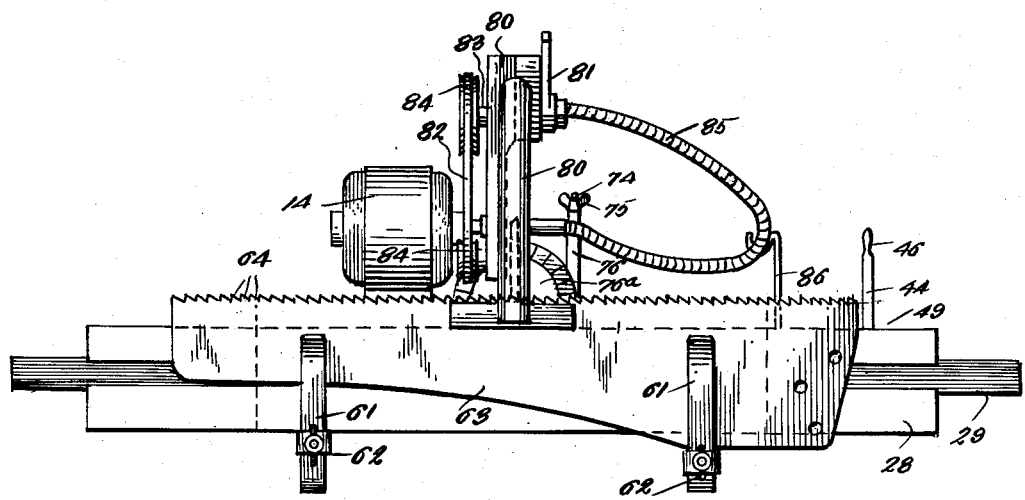
Figure 3 is a front elevational view of the apparatus.
Figure 6:
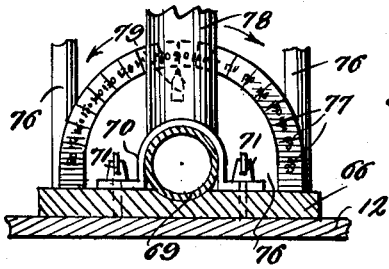
Figure 4:
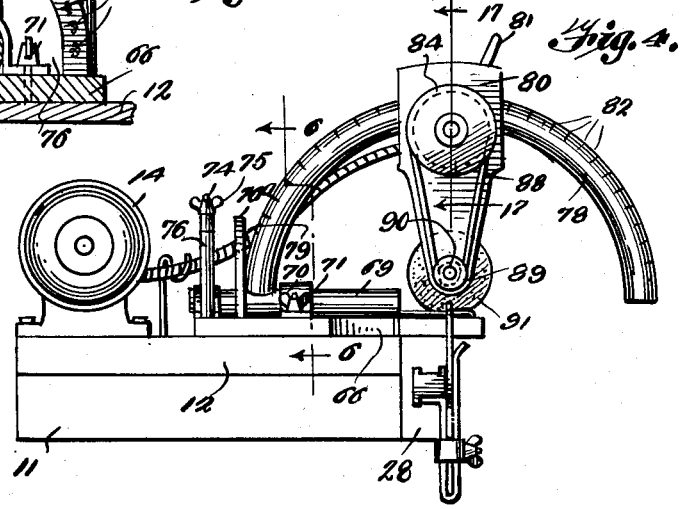
Figure 17:
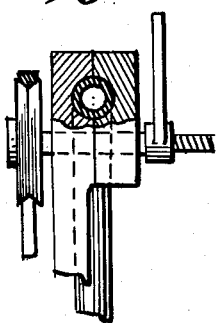

Figure 4 is an end elevational view taken in a direction opposite to that of Figure 2, Figure 5 is a sectional view taken along line 5—5 of Figure 2, Figure 6 is a fragmentary sectional view taken along line 6—6 of Figure 4, Figure 7 is a sectional view taken along line 7—7 of Figure 1, Figure 8 is a sectional view taken along line 8—8 of Figure 1, and/or line 8—8 of Figure 7, Figure 9 is a sectional view taken along line 9—9 of Figure 7, Figure 10 is a view similar to Figure 9 but with certain parts advanced due to the operation of the apparatus, Figure 11 is a sectional view taken along line 11—11 of Figure 10, Figure 12 is a fragmentary plan view, partly broken away, of a portion of the apparatus, Figure 13 is a sectional view taken along line 13—13 of Figure 11, Figure 14 is a sectional view taken along line 14—14 of Figure 13, Figure 15 is a sectional view taken along line 15—15 of Figure 14, Figure 16 is a sectional view taken along line 16—16 of Figure 8, and Figure 17 is a sectional view taken along line 17—17 of Figure 4.

Generally, there is provided a saw sharpening machine in which a saw is clamped to a housing which is provided with a hinged platform having a motor and sharpening apparatus thereon. The sharpening apparatus is unique in the provision of novel means for adjusting to exact measured position of a grinding element adapted to be driven by the motor which also, through novel apparatus, raises and lowers the platform and thereby the grinding element from contact with the saw at the same time advancing the saw blade a sufficient distance to be positioned for the next tooth thereof to be ground. A novel reversing mechanism is also provided.

Referring now more particularly to the drawings, there is shown therein a saw sharpening machine adapted to be mounted upon a work table 10 or the like and comprising a casing 11 having a platform 12 hinged at its rear edge as indicated at 13 to the rear wall of the casing.

Mounted upon the platform 12 is a motor 14 having a drive shaft 15 provided with a worm 16 which is enmeshed with a worm gear 17 which is carried at the upper end of a vertical shaft 18, the lower end of which is provided with a bevel gear 19 which is enmeshed with a bevel gear 20 mounted at one end of a horizontal shaft 21 carried by hangers 22 affixed to the underside of the platform 12. The opposite end of the shaft 21 is provided with a crank 23 having a pin 24 revolubly mounted in the upper end of an arm 25 the lower end of which is provided with a pin 26 pivotally mounted in a standard 27 affixed to the table 10.

A saw carriage 28 is transversely and slidably mounted upon a bar 29 at the front edge of the table 10 and has affixed thereon a plate 30 which is provided with an upstanding dog 31 to which is pivoted an arm 32 having a half nut 33 at its outer end.

The half nut is adapted to engage threads 34 formed upon a shaft 35, the threaded portion of which is journaled in uprights 36 and 37 attached to the table 10. The shaft protrudes through the upright 37 and extends to an upright 38 in which it is also journaled. Between the uprights 37 and 38, the shaft 35 has reciprocally mounted upon it a hollow shaft 39 which is keyed to the shaft 35, as indicated at 40 and which is provided with a bevel gear 41 at its other end. Centrally of the hollow shaft 39 there is provided a pair of annular flanges 42 between which the opposite sides of an open portion 43 of a reversing lever 44 are adapted to be. The lever 44 is pivoted to a dog 45 affixed to the table 10 and is provided with an operating handle 46 at its upper end.

A pair of standards 47 mounted upon the table 10 have transversely mounted at their upper end a shaft 48 which extends forwardly and is provided with a bevel gear 49 at its forward end. Integrally formed upon the rear face of the gear 49 is a circular ratchet 50. A spacing member 51 surrounds the shaft 48 between the standards 47. The bevel gear 49 is adapted to engage either the gear 40 or the gear 41.

To the underside of the platform 12 is affixed a detent 52 which is adapted to engage the underside of one arm of a bell-crank lever 53 which is pivoted, as indicated at 54, to a support 55 which is affixed to the table 10 and which has its other arm pivotally connected, as shown at 56 to a shaft 57 reciprocally mounted in a support 58 and which terminates in a pawl 59 adapted to engage with the ratchet 50. A spring 60 interconnects the pawl 59 and the table 10.

The saw carriage is provided with a pair of clamping members 61 each provided with thumb screws 62 for tightening the same and adapted to hold a saw 63 having teeth 64 in position for sharpening.

The platform 12 is provided with an arcuate slot 65 over which is positioned a slidably mounted base 66 having an arcuate groove 67 formed in its underside and adapted to register with an arcuate raised portion 68 in the platform 12. An axle 69 is held in position upon the base 66 by means of a clamp 70 adapted to be tightened by means of a pair of thumb screws 71 for bolts 72 the lower ends of which protrude through the slot 65 and engage the underside of the platform 12.

A rear clamp 73 also engages the axle 69 and is adapted to be tightened by a pair of bolts 74 attached to the base 66 and having thumb screws 75 adapted to bear against bolt collars 76 formed integrally with the clamp 73.

A vertically extending protractor 76 is affixed to the base 66 and is provided with indicia 77 adjacent its arcuate edge.

A forwardly extending semi-circular control arm 78 is integrally formed with the axle 69 and is provided with a pointer 79 at its rear side, the pointer being adapted to register with the indicia 77.

A plate 80 is slidably mounted upon the control arm 78 and may be clamped in selected positions thereon by means of a clamp arm 81, such positions being determined by means of indicia 82 on the arm 78.

Protruding through the upper end of the plate 80 is a shaft 83 carrying a pulley 84 at one end and having its other end interconnected with the shaft 15 by means of a flexible shafting 85 which may be supported by a looped wire member 86 affixed in a block 87 at one side of the casing 11. A belt 88 interconnects the pulley 84 with a pulley 89 carried at one end of a shaft 90 mounted in the lower end of the plate 80.

To the other end of the shaft 90 there is affixed a grinding wheel 91. The forward end of the axle 69 is provided with a pointer 92 which is adapted to register with indicia 93 upon a protractor 94 which is adapted to lie flat upon the platform 12 and abut the saw 63.

In operation, it will be seen that a saw 63 is first placed in position upon the saw carriage 28 by clamping the same with the clamps 61. Thereupon, the particular angle or degree of bevel to be ground into the teeth 64 of the saw 63 may be regulated by the position of the plate 66 as it may be positioned by means of the clamp 70 and the thumb screws 71 within the slot 65. The degree of incline in the cut of the saw teeth 64 may be regulated by the particular position of the plate 80 upon the arm 78 with respect to the particular indicia 82 thereon. With regard to the degree of pitch, this may be regulated by the particular positioning of the control arm 78 with respect to the protractor 76a, as indicated by the pointer 79 carried by the arm 78. The particular position of the arm 78 with respect to the protractor 76a may be easily regulated by means of the clamps 70 and 73.

It will also be seen that when the apparatus is in motion that the platform 12 will be alternately lifted and allowed to reassume its normal position by means of the shaft 21 operating through the crank 23 and the arm 25 which cooperate to force the shaft 21 to raise the platform 12 through the medium of brackets 22 thereby causing the platform 12 and all of its attendant parts to be lifted and redeposited as power is transferred from the motor 14 to the shaft 21. In the interim, it will be apparent that one or the other of the bevel gears 40 or 41 will be in contact with the bevel gear 49 as controlled by the reversing lever 44. Since the hollow shaft 39 is keyed to the shaft 35, the shaft 35 and its threaded portion 34 will be turned in a clockwise or counter-clockwise direction by the alternate lifting and dropping of the platform 12 and the consequent movement of the bell-crank 53 by the detent 52 and the movement of the pawl 59 in the ratchet 49. Such action will cause the half nut 33 to move along the threaded portion 34 of the shaft 35 and thus move the saw 63 during the period when the grinding wheel 91 is lifted away from the teeth 64.

While but one form of the invention has been shown and described herein, it will be readily apparent to those skilled in the art that many minor modifications may be made without departing from the spirit of the invention or the scope of the appended claim.

What is claimed is:

A saw sharpener comprising a table, a casing mounted on said table, a platform hinged at its rear end to the rear of said casing, a transversely slidable saw carriage mounted upon the forward end of the table adjacent the forward end of said platform, clamps carried by said carriage for holding a saw with its teeth uppermost and in horizontal alignment, a plate positioned upon said platform, said platform having an arcuate slot therein, said slot being centered upon said saw, a pair of thumb screws extending through said plate and said slot, a horizontal axle clamped atop said plate and extending at right angles toward said saw, a semi-circular control arm having one end affixed to said axle, a vertically extending protractor affixed to said plate in parallelism with said saw, a pointer affixed to said axle and adapted to register with said vertical protractor, a support plate adjustably and slidably clamped upon said control arm and extending in substantially the same plane as the radii of said control arm, a grinding wheel mounted upon the lower portion of said support plate and extending generally in a plane parallel to the plane of the support plate, said wheel having that portion of its outer edge most remote from said support plate lying in the path of movement of said saw teeth, means for moving said grinding wheel into and out of engagement with the teeth of said saw, and means for moving said carriage when said grinding wheel is out of engagement with said saw, said means for moving said grinding wheel into and out of engagement with said saw including a vertical shaft driven by said motor and extending through said platform, a horizontal shaft operatively connected at one end to said vertical shaft and revolubly mounted on the underside of said platform, a crank mounted upon the other end of said horizontal shaft, a pin extending laterally from the free end of said crank, a standard affixed to the table, a pin extending laterally from the upper end of said standard, and a link interconnecting said pins.

LUTE BROWN.

References Cited in the file of this patent

UNITED STATES PATENTS

| Number | Name | Date |
|---|---|---|
| 261,624 | Olney | July 25, 1882 |
| 545,064 | Fleck | Aug. 27, 1895 |
| 1,557,494 | Glang | Oct. 13, 1925 |
| 1,952,323 | Litomy | Mar. 27, 1934 |
| 2,334,136 | Underwood | Nov. 9, 1943 |
| 2,343,171 | Collier | Feb. 29, 1944 |
| 2,462,225 | Roderick | Feb. 22, 1949 |
| 2,470,290 | Chryst | May 17, 1949 |
| 2,507,371 | Eklund | May 9, 1950 |